(12) United States Patent  (10) Patent No.: US 8,482,524 B2
Reinecke  (45) Date of Patent: Jul. 9, 2013

(54) INPUT DEVICE FOR AN ELECTRONIC DEVICE

(75) Inventor: Benjamin Reinecke, Baden (AT)

(73) Assignee: Knowles Electronics Asia PTE. Ltd., Singapore (SG)

( * ) Notice: Subject to any disclaimer, the term of this patent is extended or adjusted under 35 U.S.C. 154(b) by 162 days.

(21) Appl. No.: 12/744,497

(22) PCT Filed: Nov. 21, 2008

(86) PCT No.: PCT/IB2008/054900
§ 371 (c)(1),
(2), (4) Date: Nov. 30, 2010

(87) PCT Pub. No.: WO2009/069054
PCT Pub. Date: Jun. 4, 2009

(65) Prior Publication Data
US 2011/0074678 A1    Mar. 31, 2011

(30) Foreign Application Priority Data
Nov. 26, 2007   (EP) ..................................... 07121513

(51) Int. Cl.
*G06F 3/033*    (2006.01)
*G09G 3/08*    (2006.01)
(52) U.S. Cl.
USPC ............................. 345/161; 345/207; 250/200
(58) Field of Classification Search
USPC .......... 345/156–158, 161, 169, 207; 250/200, 250/216, 221
See application file for complete search history.

(56) References Cited

U.S. PATENT DOCUMENTS

| | | | |
|---|---|---|---|
| 5,532,476 A * | 7/1996 | Mikan | 250/221 |
| 5,943,233 A * | 8/1999 | Ebina et al. | 700/85 |
| 6,300,940 B1 | 10/2001 | Ebina et al. | |
| 7,474,296 B2 * | 1/2009 | Obermeyer et al. | 345/156 |
| 8,094,121 B2 * | 1/2012 | Obermeyer et al. | 345/156 |
| 2002/0135565 A1 | 9/2002 | Gordon et al. | |
| 2005/0162389 A1* | 7/2005 | Obermeyer et al. | 345/161 |
| 2006/0284831 A1 | 12/2006 | Rosenburg | |
| 2007/0126700 A1 | 6/2007 | Wright | |
| 2007/0194215 A1 | 8/2007 | Leong et al. | |

FOREIGN PATENT DOCUMENTS
WO   2007/122556 A2   11/2007

OTHER PUBLICATIONS

International Search Report and Written Opinion for International Patent Application No. PCT/IB2008/054900 (Mar. 4, 2009).

* cited by examiner

*Primary Examiner* — Kimnhung Nguyen
(74) *Attorney, Agent, or Firm* — Steven McMahon Zeller; Dykema Gossett PLLC

(57) ABSTRACT

An input device for an electronic device is disclosed comprising a source of light (2) emitting a light beam in a first direction, a reflecting member (4) for reflecting said light beam, means for allowing tilting of the reflecting member (4) around at least one axis transverse to said first direction, at least one detector (6, 7, 8, 9) detecting the reflected light beam and outputting an electric signal corresponding to light intensity of the detected light beam in a second direction, in which the light beam is reflected, and an electronic circuit deriving a position signal from the at least one electric signal. Said means for allowing tilting of the reflecting member (4) comprise a first bearing (12) having at least one convex surface and at least one concave surface cooperating with each other in a sliding relationship thus enabling said tilting of said reflecting member (4).

17 Claims, 5 Drawing Sheets

INPUT DEVICE FOR AN ELECTRONIC DEVICE

FIELD OF THE INVENTION

The invention relates to an input device for an electronic device, the input device comprising a source of light emitting a light beam in a first direction, a reflecting member for reflecting said light beam, means for allowing tilting of the reflecting member around at least one axis transverse to said first direction, at least one detector detecting the reflected light beam and outputting an electric signal corresponding to light intensity of the detected light beam in a second direction, in which the light beam is reflected, and an electronic circuit deriving a position signal from the at least one electric signal. The invention furthermore relates to a mobile electronic device comprising an inventive input device.

BACKGROUND OF THE INVENTION

Electronic devices, e.g. computers or mobile communication devices, need input devices in order to allow users to communicate commands or other information to be processed by the computer. Input devices can be designed as pointing devices for communicating a position signal for a cursor to the electronic device. Examples include computer mice, trackballs and joysticks.

Joysticks are increasingly used as pointing devices for mobile communications devices or other hand-held electronic devices. Such joysticks have small dimensions and are usually arranged to be operated by one finger of the user. Most joysticks are two-dimensional, having two axes of movement (similar to a mouse), but three-dimensional joysticks do exist. A joystick is generally configured so that moving the stick left or right signals movement along the X axis, and moving it forward (up) or back (down) signals movement along the Y axis. Further, the stick may be configured so as to be able to be pressed down in order to signal a mouse-click.

An analog joystick is a joystick, which has continuous states, i.e. returns an angle measure of the movement in any direction in the plane or the space, usually utilizing potentiometers, whereas a switch-type joystick gives only on/off signals for four different directions, and mechanically possible combinations (such as up-right, down-left, etc.). In the future, analog joysticks will replace switch-type joysticks for increasingly complicated applications like gaming, navigation, web browsing, etc.

Usually, the movement of the joystick is detected mechanically or magnetically. However, such a configuration involves the risk of premature wear of the components and results in a bulky construction not necessarily being small enough for being integrated into a hand-held device. The power consumption of a joystick of this kind is large and problems exist regarding magnetic radiation and magnetic interference.

A joystick concept based on an optical principle and defining the field of the instant invention has been disclosed in U.S. Pat. No. 6,300,940. This joystick concept overcomes some disadvantages connected with mechanically or magnetically operating joysticks, e.g. high power consumption and the existence of magnetic radiation, but still leaves some problems unsolved. Problems specifically exist regarding the appropriate support structure for allowing the reflecting member to be tilted. The support structures disclosed in U.S. Pat. No. 6,300,940 are made of a flexible rubber material. However, such flexible support structures usually do not meet the high demands in connection with mobile electronic devices, which usually are subject to mechanical shocks, insolation, dust exposure and other external influences, while having to stand several million activations of the joystick. The flexibility and integrity of rubber is negatively affected when getting older and when being exposed to heat and insolation. Further, the support structure as disclosed in U.S. Pat. No. 6,300,940 is not sufficiently protected against dust and other contamination. Moreover, the known support structures cannot be miniaturized to a sufficient extent in order to allow integration into small handheld electronic devices. Further, the known support structures have considerable drawbacks concerning ease of assembly.

Hence, it is an object of the invention, to provide an input device of the type mentioned in the first paragraph and a mobile electronic device of the type mentioned in the first paragraph, which obviates the drawbacks described.

OBJECT AND SUMMARY OF THE INVENTION

The object of the invention is achieved by providing an input device as described in the opening paragraph, characterized in that said means for allowing tilting of the reflecting member comprise a first bearing having at least one convex surface and at least one concave surface cooperating with each other in a sliding relationship thus enabling said tilting of said reflecting member.

The object of the invention is furthermore achieved by a mobile electronic device comprising an inventive input device.

In this way a bearing is provided for the reflecting member that can be easily manufactured and easily assembled using standard procedures. Standard wear-resistant materials, plastic being preferred, can be used, whereby rubber can be avoided. The inventive design provides for a simple construction requiring a minimum amount of parts.

A significant advantage is that a bearing structure comprising at least one convex surface and at least one concave surface cooperating with each other in a sliding relationship can be miniaturized to a sufficient extent so as to allow integration of the input device into mobile electronic devices, whereby it has to be noted that a miniaturization may be achieved to reach dimensions of the entire input device of as small as 3-5 mm in width and 1.5 mm in height or even smaller. In this context the inventive design is in particular responsible for obtaining the required reduction of the constructional height of the input device.

The inventive design allows for tilting around at least one axis transverse to the direction of the light beam emitted by the light source, whereby said axis is defined by the arrangement and the curvature of the cooperating surfaces of the first bearing. Within the scope of the invention it is easily possible to define more than one axis for tilting. In particular, it is possible to define at least two axes for tilting, said at least two axes advantageously extending perpendicular to each other for enabling the joystick to be tilted side wards to the left and to the right as well as upwards and downwards, whereby the reflecting member is precisely guided by the cooperating surfaces of the bearing being in sliding relationship with each other.

Due to the small dimensions of the input device to be achieved, the bearing structure is correspondingly small thereby involving the risk of reduced stability. In order to increase the stability of the bearing structure, the configuration is advantageously devised such that said means for allowing tilting comprise a second bearing having at least one convex surface and at least one concave surface cooperating with each other in a sliding relationship. The second bearing is intended to provide further support and guidance for the reflecting member when being tilted, whereby the first and second bearing are both effective simultaneously when tilting the reflecting member about a specific axis. This configuration ensures a smooth operation of the inventive device over a long period of time.

In this connection it is advantageous when said second bearing has a larger diameter than said first bearing. This configuration allows for a compact design, while still giving further guidance to the reflecting member.

A particular compact design may be achieved according to a preferred embodiment, wherein said first bearing and said second bearing comprise a common bearing member, said common bearing member carrying said concave surface of said first bearing cooperating with said convex surface arranged on a portion of said reflecting member and further carrying said convex surface of said second bearing cooperating with said concave surface arranged on a portion of said reflecting member. In this embodiment the common bearing member carries the concave surface of said first bearing preferably on its inner periphery and the convex surface of said second bearing preferably on its outer periphery, whereby an inner portion of the reflecting member is guided within a region defined by the inner periphery and an outer portion of the reflecting member forms a bracket-like structure encompassing the outer periphery of the bearing element. The encompassing portion of the reflecting member may serve to prevent dust, water or other contamination from penetrating into the device, which would otherwise negatively affect the proper functioning of the device.

In order to avoid that the reflecting member gets jammed when tilting and in order to guarantee a smooth tilting operation the configuration is advantageously devised such that said first bearing and said second bearing are arranged to be concentric. This means that the first and the second bearing allow for tilting around the same axis.

It is of advantage when said cooperating surfaces are cylindrical thus enabling a precise guiding of the reflecting member along a defined tilting path.

If, however, tilting of the reflecting member shall not be restricted to one or more defined tilting path(s) a construction is more advantageous where said cooperating surfaces are spherical. Thus, the cooperating surfaces are forming a spherical joint allowing any tilting direction desired.

In any case, the exterior surface of the reflecting member may have an inscription indicating the directions in which the reflecting member may be tilted or describing the functions of the electronic device connected with the respective tilting directions. In this case or for any other reason it may be desirable to avoid rotation of the reflecting member and thus changing the orientation of the inscription on the reflecting member. To this end, according to a preferred embodiment, the inventive device comprises an anti-twist protection for avoiding rotation of the reflecting member around an axis oriented in said first direction.

In a particularly simple manner the anti-twist protection may be designed as at least one pin or recess being part of the reflecting member cooperating with a rotationally fast recess or pin, respectively.

According to another advantageous embodiment of the inventive device the cooperating surfaces of at least one of said first and said second bearing form a non-circular perimeter when viewed in said first direction, thereby forming said anti-twist protection. Here the respective bearing is obviously not designed as a spherical bearing, but as a bearing comprising several cylindrical surfaces arranged to form a non-circular perimeter. Thus, in this configuration the bearing is simultaneously functioning as an anti-twist protection.

A further beneficial embodiment of the input device is achieved, when it comprises an elastic member cooperating with said reflecting member for urging the reflecting member into a neutral position after having been tilted around said at least one axis transverse to said first direction. In this way the usability is further improved, whereby the user gets a force-feedback when tilting the reflecting member and at the same time the elastic member urges the reflecting member back into the neutral position after the user has terminated the tilting action.

In an advantageous manner the elastic member may be arranged between said reflecting member and said bearing member so as to achieve a compact design and at the same time arrange the elastic member in a safe location where it is protected against external influences, e.g. dust and water. In this connection it is advantageous when said elastic member is a leaf spring. The leaf spring may be made of metal, but may also be made of plastic, both materials being able to withstand several million actuation cycles.

In order that the user is able to additionally perform a "mouse-click" the configuration is advantageously devised in a manner that the input device comprises means for allowing shifting of said reflecting member in a direction towards said detector. Shifting may be possible in the neutral position of the reflecting member, but may also be possible in any tilted position, depending on the respective requirements for a particular application.

In this connection a very advantageous embodiment of the inventive input device is achieved when said means for allowing shifting are designed as material diminution in said bearing member, said material diminution forming an elastically bendable region. Here, the click action is made possible without the need to incorporate additional components into the inventive device. It is merely necessary to realize the bearing element with a material diminution, thereby forming an elastically bendable region. Due to the fact the bending is performed elastically, the reflecting member is automatically urged back into its original position after the click action has been performed. Furthermore, the shifting function may be designed in such a way that the reflecting member "snaps" down when it is activated. In this way the user gets a clear feedback from the input device whether the reflecting member is down or up.

Advantageously said material diminution is arranged between an inner and an outer region of said bearing member, thereby allowing said inner region to be flexed down towards said detector. The inner region of the bearing member usually carrying the first bearing for supporting the reflecting member, this configuration allows the bearing to be shifted towards the detector while still supporting the reflecting member so that the reflecting member may be tilted even in the shifted down position or the reflecting member be shifted down in a tilted position.

According to a further advantageous embodiment the inventive input device comprises means for limiting the tilting movement of said reflecting member. This configuration enhances the usability of the device and gives the user a clear indication of when the maximum tilting angle is reached.

In this connection a particular robust configuration may advantageously be achieved when said means for limiting the tilting movement comprise at least one inclined abutment surface of said bearing member facing a surface of said reflecting member. Here the maximum tilting angle is reached when the surface of the reflecting member abuts onto the abutment surface of the bearing member, whereby the planar contact between both surfaces ensures that the device does not get damaged even when high forces are exerted by the user. As mentioned above, an elastic element may be arranged between the bearing member and the reflecting member, in which case the planar contact between the abutment surfaces would be achieved via said elastic element if the elastic element is formed by a planar spring or the like.

These and other aspects of the invention are apparent from and will be elucidated with reference to the embodiments described hereinafter.

BRIEF DESCRIPTION OF THE DRAWINGS

The invention will be described in greater detail hereinafter, by way of non-limiting examples, with reference to the embodiments shown in the drawings.

DESCRIPTION OF EMBODIMENTS

Figure 1:
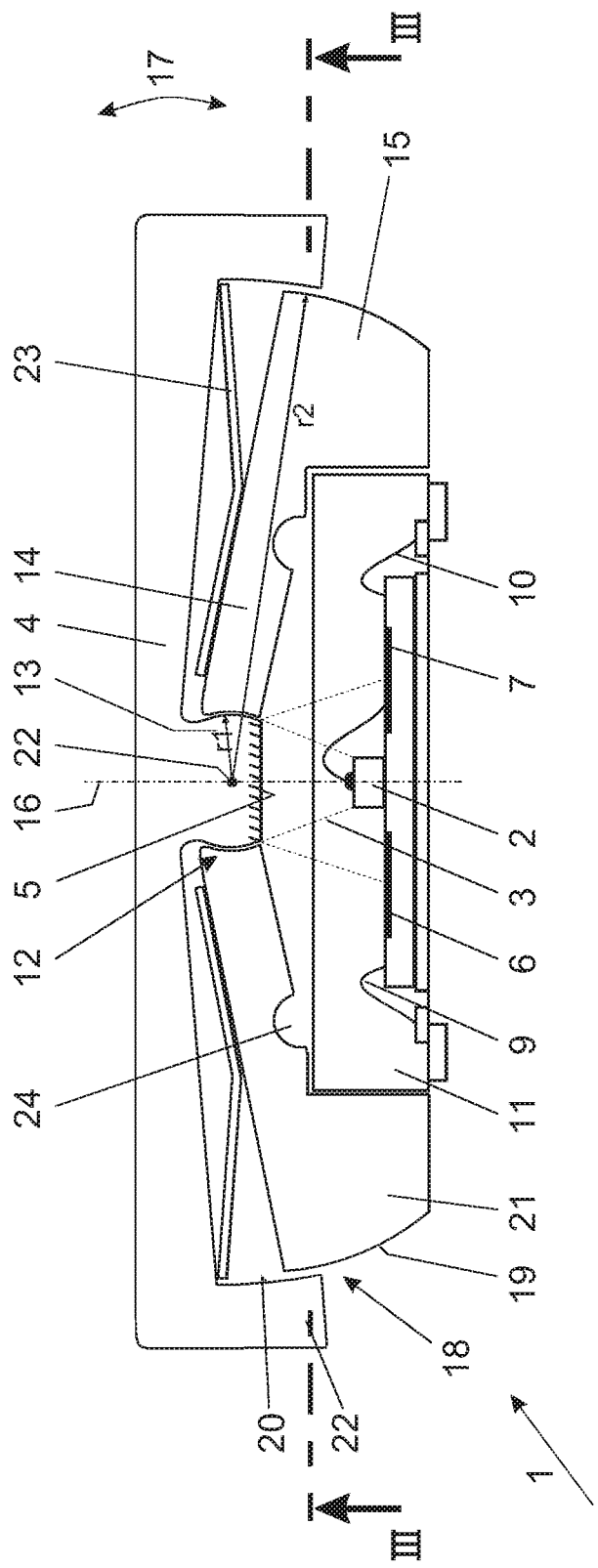
FIG. 1 shows a cross section of the inventive device with the reflecting member in the neutral position.

FIG. 1 shows an inventive input device 1 comprising a light emitting diode (LED) 2 functioning as a source of light. LED 2 is emitting a light beam 3 towards a reflecting member 4, which has a reflecting surface 5 reflecting the light beam in a direction depending on the tilting position of reflecting member 4. The reflected light is detected by detectors (photodiodes) 6, 7, 8 and 9, resulting in an output of an electrical signal corresponding to light intensity of the detected light beam. The electrical signals are led to an analyzing circuit via electric connections 10 as explained later in more detail. LED 2, photodiodes 6, 7, 8 and 9 and the electrical connections 10 are all embedded in a clear-transparent compound package 11.

In order to allow tilting, the reflecting member 4 is supported by a first bearing 12 designed as a spherical bearing having a convex surface formed on a central protrusion 13 of reflecting member 4 cooperating in a sliding relationship with a concave surface formed on an inner region 14 of a bearing member 15. Because first bearing 12 designed as a spherical bearing it enables tilting about any axis transverse or perpendicular to central axis 16. One of the possible tilting movements is designated by double arrow 17. The central protrusion may easily be snapped into the bearing member 15 in order to facilitate manufacturing.

The tilting movement is further supported by a second bearing 18 having a plurality of convex surfaces 19 cooperating with respective concave surfaces 20. The convex surfaces 19 are formed on an outer region 21 of the bearing member 15. The concave surfaces 20 are formed on the inner circumference of a protruding part 22 of reflecting member 4 encompassing bearing member 15. The convex surfaces 19 and the concave surfaces 20 are cylindrical and are designed to allow tilting of the reflecting member 4 about two axis perpendicular to central axis 16. The first bearing 12 and the second bearing 18 essentially have the same center 22, the radii of the cooperating surfaces schematically being indicated by r1 and r2. In this connection it has to be noted that the curvature of the cooperating surfaces 19 and 20 of the second bearing 18 do not necessarily have to have the same curvature, but preferably have different curvature in order to avoid collision of the surfaces when tilting. In particular, the curvature of surface 19 is greater than curvature of surface 20 so that there is a small gap between the cooperating surfaces 19 and 20. In this way the cylindrical bearing whose axis is orientated transverse or even perpendicular to the axis, around which the reflecting member 4 is tilted, does not hamper the said tilting.

Reflecting member 4 may be operated as a control knob of the input device, the upper surface of reflecting member 4 preferably bearing an indication of the functions associated with the respective tilting directions.

An elastic member 23 is arranged between reflecting member 4 and bearing member 15. In the embodiment shown in FIG. 1 the elastic member 23 is designed as a leaf spring or washer, one arm of which is supported on the inner region 14 of the bearing member 15 and the other arm of which is stressed against a lower surface of reflecting member 4. The spring may be designed as one annular washer, as shown in FIG. 1. Alternatively, the elastic element may comprise several discrete spring elements distributed in circumferential direction around the central axis 16. When no external forces are applied to the upper surface by a user, the elastic member 23 holds the reflecting member 4 in a neutral position as shown in FIG. 1. After having been tilted to a position such as, e.g., the tilting position shown in FIG. 2, the elastic element 23 will urge reflecting member 4 back into the neutral position shown in FIG. 1.

Further, bearing member 15 comprises a material diminution or an annular recess 24 forming an elastically bendable region of the bearing member 4 located between the inner region 14 and the outer region 21, thereby enabling a shifting movement of the reflecting member 4 along the central axis 16 when a user applies pressure. In this way the reflective member 4 is shifted down towards LED 2, thereby changing the electrical signal output by the detectors 6, 7, 8 and 9 as will be described later. In this way a "mouse-click" may be signalled to the electrical device. Because the inner region 14 is moved outwards when the reflecting member 4 is moved down, there is a counteracting force, which reaches its maximum when the inner region is oriented horizontally. If the reflecting member 4 is moved beyond this position said counteracting force decreases. So, if the user of the input device 1 keeps pressing the reflecting member 4, suddenly it "snaps" down until the reflecting surface 5 bears on compound package 11 what gives the user of the input device 1 a clear feedback whether the reflecting member 4 is pressed (enough) or not.

The protruding part 22 of the reflecting member 4 which encompasses the bearing member 15 forms a protection against entry of dirt into the inside of the input device 1. In this way, the sensible parts of the device, such as the first bearing 12, the detectors 6, 7, 8 and 9 and LED 2 will be kept free of dust, water and other contamination. Moreover, the free space between the bearing member 15 and the reflecting member 4 housing the elastic element 23 will also be protected from dirt so that a smooth operation of the tilting member will be safeguarded over a long period of time.

Figure 2:
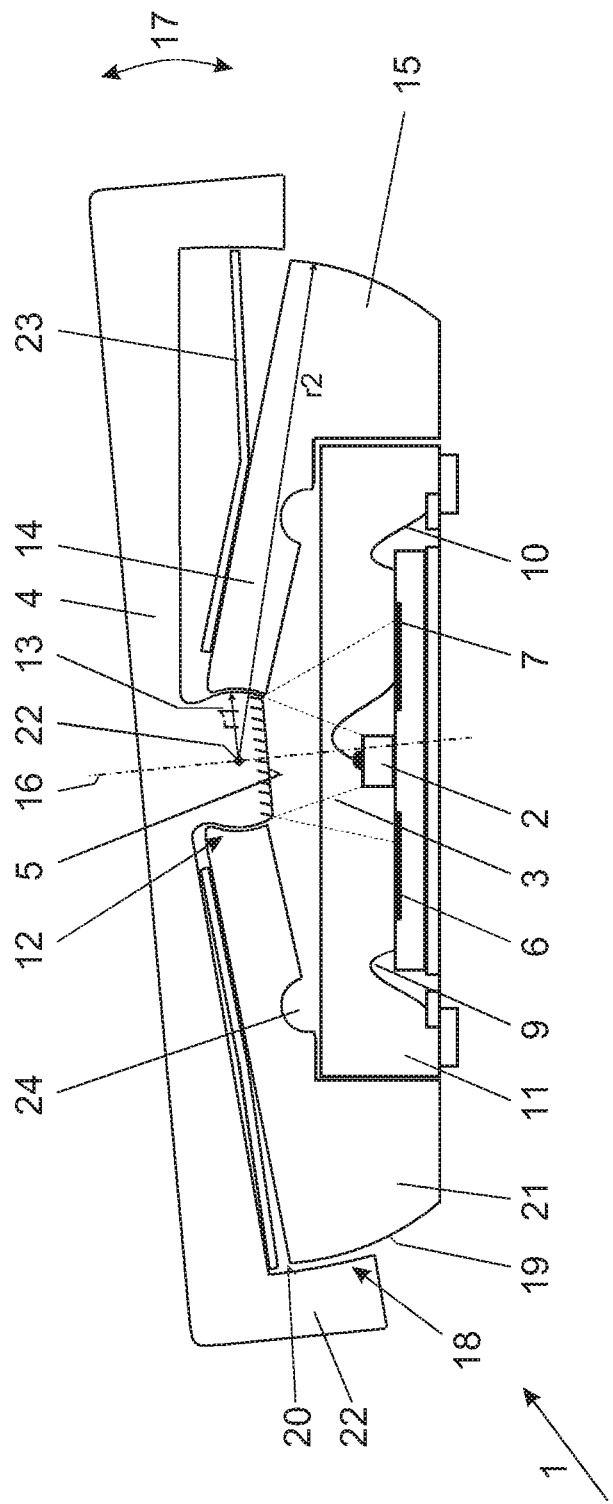
FIG. 2 shows a cross section of the inventive device with the reflective member in a tilted position.

FIG. 2 shows the input device 1, whereby the reflective member 4 is in a tilted position. Reference numerals are taken to be the same as in FIG. 1 for similar components. The reflected light cone has been shifted in a direction perpendicular to the axis of tilting. The elastic member 23 on one side is in a strained position, whereby it is relaxed on the opposite side.

Figure 3:
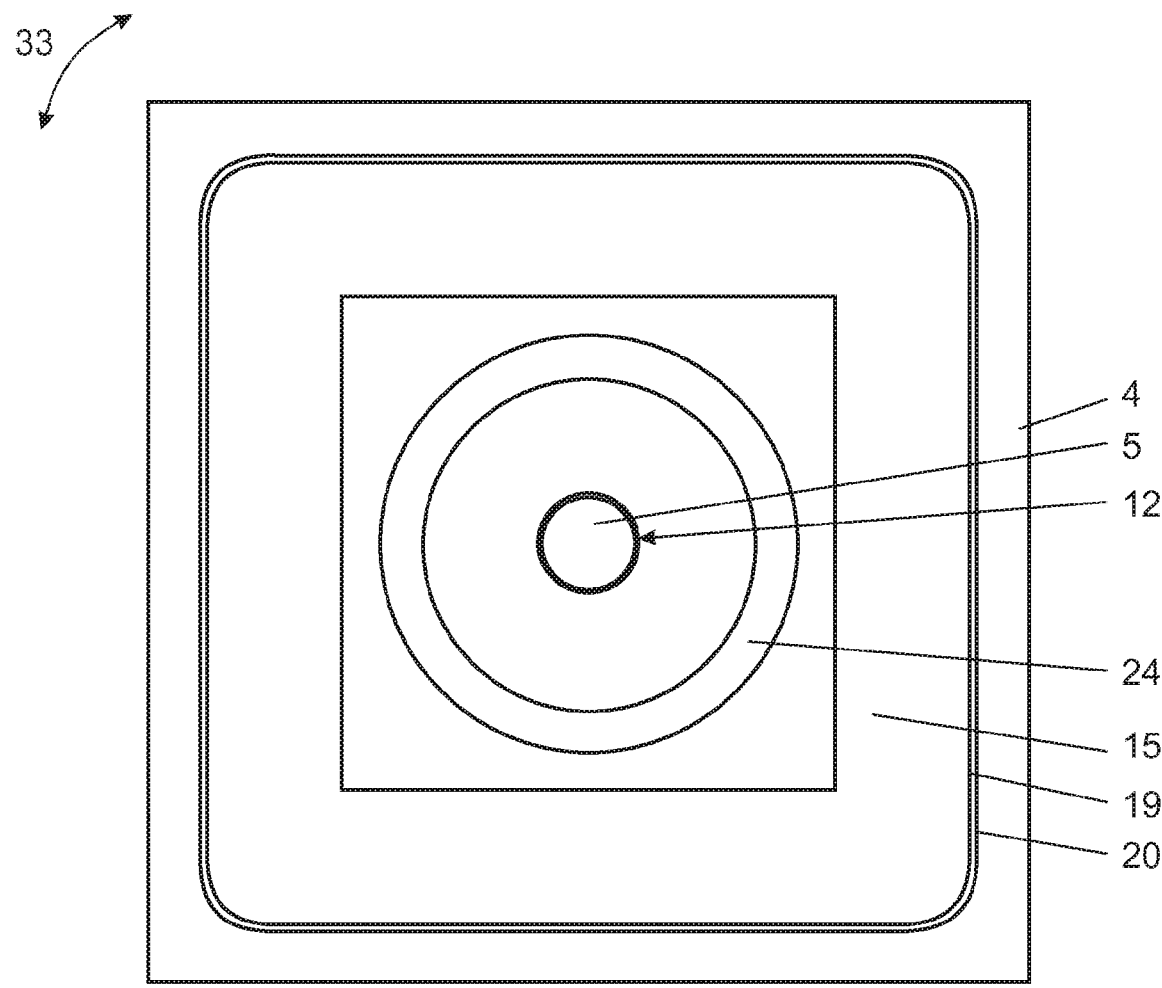
FIG. 3 shows a section according to line III-III of FIG. 1.

FIG. 3 shows a cross section along a horizontal plane, whereby one may see that the reflecting surface 5 is a circular surface. In this connection it has to be noted that the first bearing 12 being designed as a spherical bearing would allow the reflecting member 4 to rotate around axis 16, which, however, would create confusion in particular if the upper surface of reflecting member 4 was used for indicating the functions associated with the respective tilting directions. Therefore, an anti-twist protection is provided by the second bearing 18 being non-circular in the cross sectional view as shown in FIG. 3. The perimeter is essentially rectangular with the edges being rounded in order to facilitate diagonal tilting. Basically, the second bearing 18 comprises two cylindrical bearings with perpendicular axis and rounded corners in this embodiment. As stated hereinbefore, furthermore there is a small gap between the cooperating surfaces 19 and 20 so that the tilting is not hindered.

Figure 4:
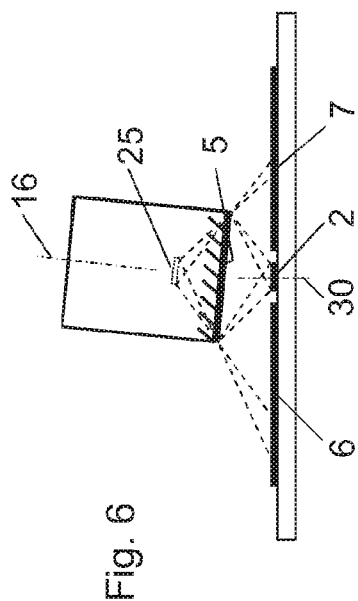
FIG. 4 shows a schematic illustration of the optical detection system with the reflecting member in the neutral position.

FIG. 4 shows an optical diagram for the neutral position of reflecting member 4 with the shortest and the longest paths for a photon emitted from LED 2 as well as the imaginary image 25 of LED 2 being schematically indicated.

Figure 5:
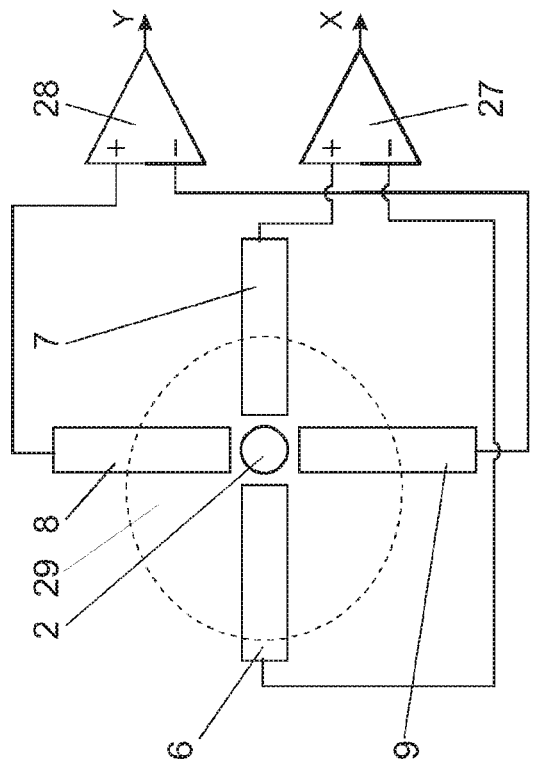
FIG. 5 shows a top view of the optical system according to FIG. 4.

FIG. 5 shows the outline of the reflected light cone 26 covering the photodiodes 6, 7, 8 and 9, whereby the photodiodes 6 and 7 are resolving the x-direction and photodiodes 8 and 9 are resolving the y-direction. The light intensity received by the photodiodes 6 and 7 is fed into an operational amplifier 27, which in the perfectly neutral case gives zero output as the light intensities detected by both photodiodes 6 and 7 are equal. The same is true for the photodiodes 8 and 9, the output of the operational amplifier 28 being zero.

Figure 6:
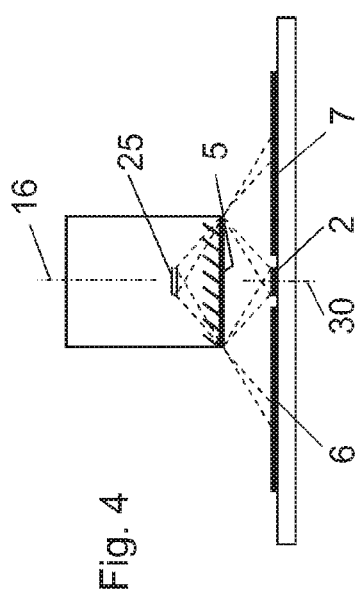
FIG. 6 shows a schematic illustration of the optical detection system with the reflecting member in a tilted position.

In FIG. 6 the ray diagram for the tilted position of the reflecting surface 5 shows the distribution of the light, whereby the central axis of the light cone normal to the reflecting surface 5 is labelled 16. As the photodiodes 6, 7, 8 and 9 are in a plane that is not normal to the light cone axis 30 the cone section for small tilting movements will be an ellipse. This results in the sectional view in a larger reflected image in the direction of the tilt.

Figure 7:
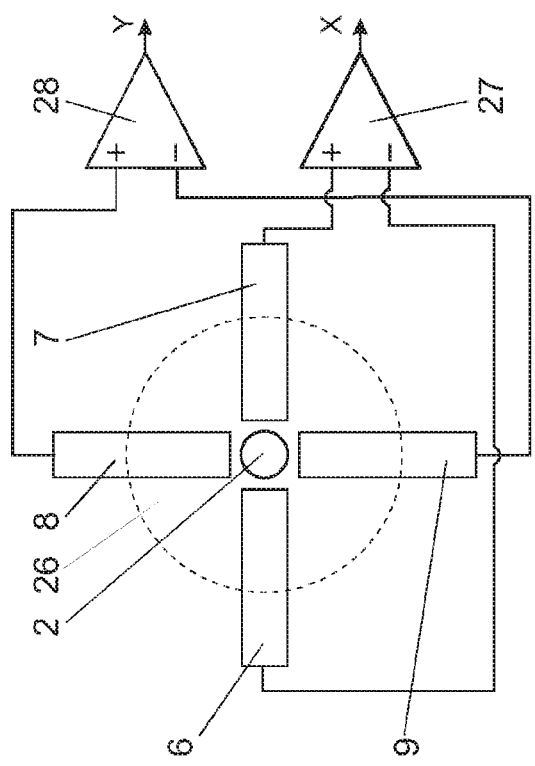
FIG. 7 shows a top view of the optical system according to FIG. 6.

In FIG. 7 the outline of the reflected light cone is denoted with 29 and clearly visible it is elliptic. Because of the fact that the focus, i.e. the place where the axis of the light cone intersect the resolving plane, shifts to one side and the fact that the eccentricity of the outline of the reflected light cone 29 increases from being zero in the neutral position, the photodiode 6 detects more light than photodiode 7, whereby feeding both signals into the operational amplifier 27 results in a non-zero signal proportional to the tilting angle of the reflective member 4. Due to the shift of the light cone both detectors 8 and 9 detect less light as the cone is shifted out of the central position, but both at the same time and hence the output of the operational amplifier 28 resolving the y-direction stays zero.

Figure 8:
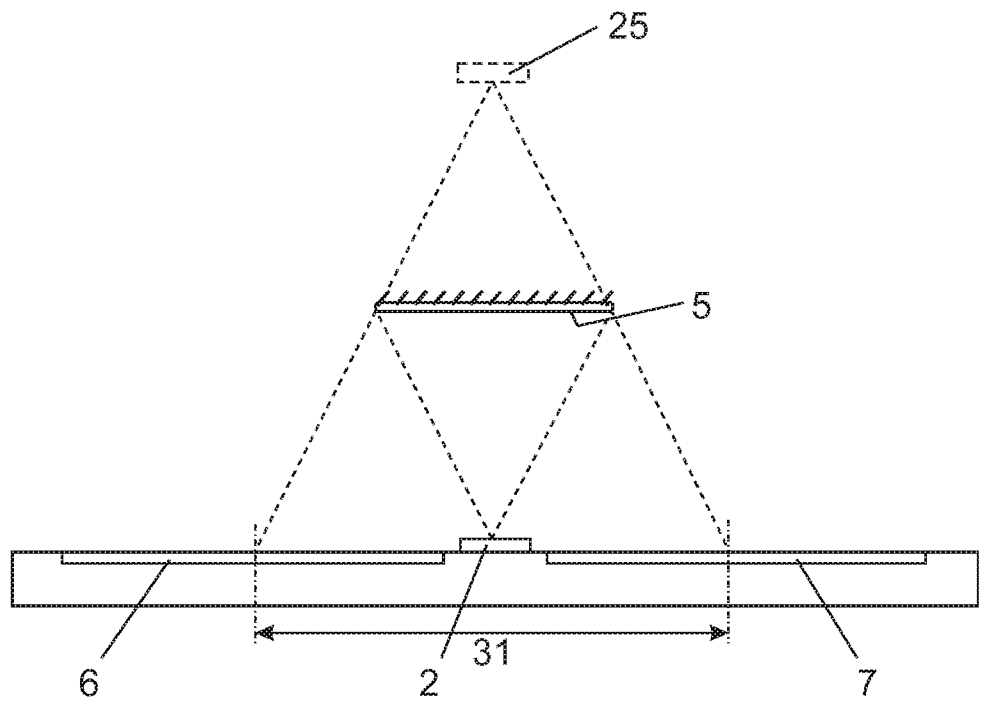
FIG. 8 shows a schematic illustration of the optical detection system with the reflecting member in the neutral position.

In FIG. 8 the diameter of the image of the reflected light cone on the surface, which contains the photodiodes 6 and 7 is labelled with 31. Considering that the light source or LED 2 is a point source then all the energy is put out in a spherical wave with the source in its origin. In the neutral position the opening angle of the light cone is then the angle between the rays going from LED 2 to the most extreme positions on reflecting surface 5 and is the same as the opening angle from the imaginary image 25 of LED 2 to the same extreme positions of the mirror.

Figure 9:
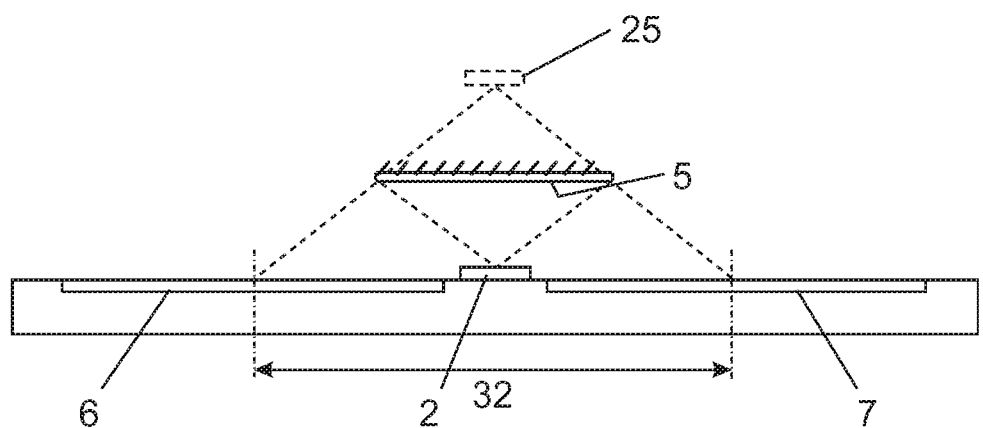
FIG. 9 shows an illustration according to FIG. 8 with the reflecting member being shifted down.

FIG. 9 shows the reflecting member 4 in the neutral position but shifted towards the detector (active "mouse click"). The diameter of the image of the reflected light cone on the surface, which contains the photodiodes 6, 7, 8, and 9 is denoted with 32 and is the same as in FIG. 8. According to the ray diagram the opening angle is now greater than before. Further, the imaginary image 25 of LED 2 is now closer to the detecting plane. As the light is emitted as a spherical wave evenly distributing the energy over the whole sphere, a unit square detects more energy if moved closer to the source. The intensity distributed over the whole sphere stays the same but drops proportional to $1/r^2$ per unit area. This leads to an overall increase in the detected light intensities on the photodiodes 6, 7, 8 and 9. In order to detect this electronically one has to read out the actual intensities that the photodiodes 6, 7, 8 and 9 detect rather than analysing this data using operational amplifiers, as was the case for the detection of the tilting movement.

Finally, it should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprise" and its conjugations do not exclude the presence of elements or steps other than those listed in any claim or the specification as a whole. The singular reference of an element does not exclude the plural reference of such elements and vice-versa. In a device claim enumerating several means, several of these means may be embodied by one and the same item of software or hardware. The mere fact that certain measures are recited in mutually different dependent claims does not indicate that a combination of these measures cannot be used to advantage.

The invention claimed is:

1. An input device for an electronic device, the input device comprising:
    a source of light emitting a light beam in a first direction,
    a reflecting member for reflecting said light beam,
    tilting means for allowing tilting of the reflecting member around at least one axis transverse to said first direction,
    at least one detector that detects the reflected light beam and outputs an electric signal corresponding to a light intensity of the detected light beam in a second direction, in which the light beam is reflected, and
    an electronic circuit adapted to derive a position signal from the at least one electric signal,
    wherein said tilting means comprises:
        a first bearing having at least one convex surface and at least one concave surface cooperating with each other in a sliding relationship; and
        a second bearing having at least one convex surface and at least one concave surface cooperating with each other in a sliding relationship,
        wherein said first bearing and said second bearing comprise a common bearing member, said common bearing member carrying said concave surface of said first bearing cooperating with said convex surface arranged on a portion of said reflecting member and further carrying said convex surface of said second bearing cooperating with said concave surface arranged on a portion of said reflecting member thus enabling said tilting of said reflecting member.

2. An input device according to claim 1, wherein said second bearing has a larger diameter than said first bearing.

3. An input device according to claim 1, wherein said first bearing and said second bearing are arranged to be concentric.

4. An input device according to claim 1, wherein said cooperating surfaces are cylindrical.

5. An input device according to claim 1, wherein said cooperating surfaces are spherical.

6. An input device according to claim 1, further comprising an anti-twist protector for avoiding rotation of the reflecting member around an axis oriented in said first direction.

7. An input device according to claim 6, wherein said anti-twist protector is designed as at least one pin or recess being part of the reflecting member cooperating with a rotationally fast recess or pin, respectively.

8. An input device according to claim 6, wherein the cooperating surfaces of at least one of said first and said second bearings form a non-circular perimeter when viewed in said first direction, thereby forming said anti-twist protector.

9. An input device according to claim 1, further comprising shifting means for allowing shifting of said reflecting member in a direction towards said detector.

10. An input device according to claim 1, further comprising limiting means for limiting the tilting movement of said reflecting member.

11. An input device according to claim 10, wherein said limiting means comprises at least one inclined abutment surface of said bearing member facing a surface of said reflecting member.

12. A mobile electronic device comprising an input device according to claim 1.

13. An input device for an electronic device, the input device comprising:
- a source of light emitting a light beam in a first direction;
- a reflecting member for reflecting said light beam;
- tilting means for allowing tilting of the reflecting member around at least one axis transverse to said first direction;
- an elastic member cooperating with said reflecting member for urging the reflecting member into a neutral position after having been tilted around said at least one axis transverse to said first direction;
- at least one detector that detects the reflected light beam and outputs an electric signal corresponding to a light intensity of the detected light beam in a second direction, in which the light beam is reflected; and
- an electronic circuit adapted to derive a position signal from the at least one electric signal,
- wherein said tilting means comprises a first bearing having at least one convex surface and at least one concave surface cooperating with each other in a sliding relationship thus enabling said tilting of said reflecting member.

14. An input device according to claim 13, wherein said elastic member is arranged between said reflecting member and said bearing member.

15. An input device according to claim 13, wherein said elastic member is a leaf spring.

16. An input device for an electronic device, the input device comprising:
- a source of light emitting a light beam in a first direction;
- a reflecting member for reflecting said light beam;
- tilting means for allowing tilting of the reflecting member around at least one axis transverse to said first direction;
- at least one detector that detects the reflected light beam and outputs an electric signal corresponding to a light intensity of the detected light beam in a second direction, in which the light beam is reflected;
- shifting means for allowing shifting of said reflecting member in a direction towards said detector, wherein said shifting means is designed as material diminution in said bearing member, said material diminution forming an elastically bendable region; and
- an electronic circuit adapted to derive a position signal from the at least one electric signal,
- wherein said tilting means comprises a first bearing having at least one convex surface and at least one concave surface cooperating with each other in a sliding relationship thus enabling said tilting of said reflecting member.

17. An input device according to claim 16, wherein said material diminution is arranged between an inner and an outer region of said bearing member, thereby allowing said inner region to be flexed down towards said detector.

* * * * *

UNITED STATES PATENT AND TRADEMARK OFFICE
CERTIFICATE OF CORRECTION

PATENT NO.       : 8,482,524 B2                                            Page 1 of 1
APPLICATION NO. : 12/744497
DATED            : July 9, 2013
INVENTOR(S)      : Benjamin Reinecke It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 352 days.

Signed and Sealed this

Eighth Day of September, 2015

Michelle K. Lee
*Director of the United States Patent and Trademark Office*